United States Patent

[11] 3,545,486

| [72] | Inventor | William C. Larson |
| --- | --- | --- |
| | | Utica, Michigan |
| [21] | Appl. No. | 795,465 |
| [22] | Filed | Jan. 31, 1969 |
| [45] | Patented | Dec. 8, 1970 |
| [73] | Assignee | Holley Carburetor Company |
| | | Warren, Michigan |
| | | a corporation of Michigan |

[54] IN-LINE VALVING ASSEMBLY
10 Claims, 5 Drawing Figs.

[52] U.S. Cl. .................................................. 137/554,
251/31, 251/58, 251/62
[51] Int. Cl. ..........................................F16k 37/00,
F16k 1/20
[50] Field of Search.......................................... 137/553,
554; 251/58, 62, 31, 305—308

[56] References Cited
UNITED STATES PATENTS

| 3,023,774 | 3/1962 | Schuller ....................... | 137/553 |
| --- | --- | --- | --- |
| 3,107,892 | 10/1963 | Ellis............................. | 251/58X |
| 3,241,568 | 3/1966 | Mayo .......................... | 251/58X |
| 3,355,728 | 11/1967 | Smith........................... | 251/306X |

Primary Examiner—Henry T. Klinksiek
Attorney—Walter Potoroka, Sr.

ABSTRACT: A flow-through conduit has situated therein a pivotally mounted valve operatively connected to a resiliently biased tubular differential area piston slidably guided within the conduit so as to be in alinement with the conduit.

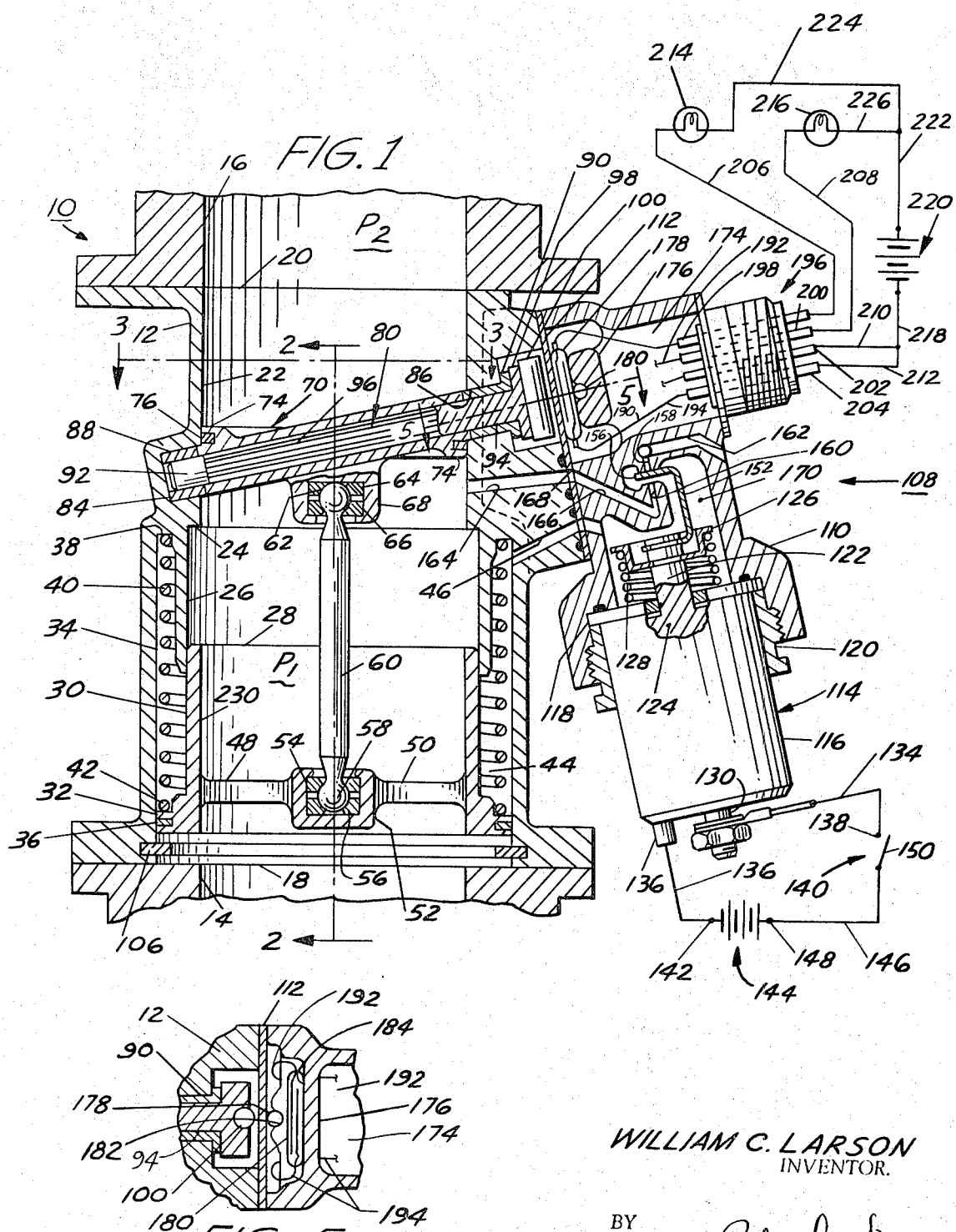
WILLIAM C. LARSON
INVENTOR.
BY Walter Potoroko, Jr.
ATTORNEY

PATENTED DEC 8 1970

WILLIAM C. LARSON
INVENTOR.

BY
Walter Potroka, Jr.
ATTORNEY

IN-LINE VALVING ASSEMBLY

BACKGROUND OF THE INVENTION

Often in aircraft applications, there is a need for valving means to control the flow of air from an aircraft gas turbine engine compressor, to certain areas of the aircraft, in order to prevent or remove ice formation on such aircraft surfaces. Such valving means may be actuated by the same high-temperature, high-pressure air that it supplies through suitable duct work to those areas of the aircraft which normally are subjected to icing during certain conditions of operation.

Many prior art valving arrangements have been operated by such means as electric motors while others have employed an axially movable valving member with means for continuously flowing high-pressure air through an orifice into the centrally disposed movable portion of the valving member, and thence to the atmosphere or to a point downstream thereof while open. Such arrangements have been found to be too slow in response time as well as susceptible to undesirable leakages.

Accordingly, the invention herein disclosed and claimed concerns itself with the solution of the above as well as other problems of the prior art structures.

SUMMARY OF THE INVENTION

According to the invention, a valve assembly for controlling the flow of a relatively high-pressure fluid comprises a housing, an inlet formed in said housing for admitting said fluid under said high-pressure, an outlet formed in said housing, conduit means formed in said housing and interconnecting said inlet and said outlet, a valve member situated within said conduit means for pivotal rotation therein to and from opened and closed positions, said valve member being located generally between said inlet and said outlet so as to be effective when closed to prevent the flow of said fluid through said outlet, differential area pressure responsive piston means situated in said conduit means on the inlet side of said valve member, motion transmitting means operatively interconnecting said valve member and said pressure responsive piston means for causing pivotal rotation of said valve member upon movement of said pressure responsive piston means, and additional means for at times directing pressures of varying magnitudes to opposed portions of said pressure responsive piston means for causing said piston means to undergo movement and cause pivotal rotation of said valve member.

Accordingly, a general object of this invention is to provide a fluid valving device which may be operated as by high-pressure air supplied by a turbine engine compressor for at times directing such high-pressure air to selected surfaces of the turbine engine and/or removing frost or ice formations from such selected surfaces.

Another object of this invention is to provide a fluid valving device which has a pivotally mounted valve member for controlling fluid flow and a generally tubular differential area pressure responsive actuating piston member for moving said valve member to and from opened and closed positions.

Other more specific objects and advantages of the invention will become apparent when reference is made to the following detailed description considered in conjunction with the accompanying drawings.

DESCRIPTION OF THE DRAWINGS

In the drawings, wherein certain details may be omitted from one or more views for purposes of clarity:

FIG. 1 is a general longitudinal cross-sectional view of a valve assembly constructed in accordance with the teachings of this invention;

FIG. 5 is a fragmentary cross-sectional view taken generally on the plane of line 5–5 of FIG. 1 and looking in the direction of the arrows.

DESCRIPTION OF THE PREFERRED EMBODIMENT

Figure 3:
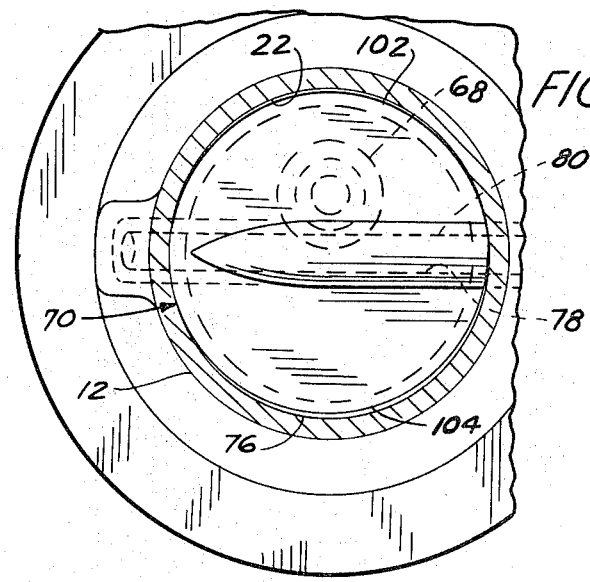
FIG. 3 is a fragmentary cross-sectional view taken generally on the plane of line 3–3 of FIG. 1 and looking in the direction of the arrows.

Referring now in greater detail to the drawings, FIG. 1 illustrates an anti-icing valve assembly 10 having a housing 12 with conduit means formed therein so as to be at times complete communication with oppositely disposed conduit portions 14 and 16. Conduit 14, in this illustration, may be one communicating the high-pressure, high-temperature air from a turbine engine compressor (not shown) to the inlet end 18 of the valve assembly 10, while conduit 16 directs the air from the outlet 20 of the valve assembly 10 to some selected surface or receiving area (not shown).

The conduit means formed through housing 12 is comprised of a first conduit portion 22 communicating at its outer end with discharge conduit 16 and terminating in a stepped portion 24 which, in effect, defines the inner end of an enlarged cylinder or cylindrical surface 26 which slidably receives a piston 28 therein. As can be seen, the piston 28 has a first diameter 30, slidably received with cylinder 26, and a larger diameter 32 slidably received within a second bore or cylinder 34 formed in housing 12 substantially concentrically with cylinder 26. As shown, a piston type sealing ring 36 may be carried within the larger diameter 32 of piston 28. The second larger cylinder 34 may extend upwardly and terminate as at 38 in order to thereby provide a spring seat for a coiled compression spring 40 which has its lower end 42 operatively engaged by the larger diameter portion 32 of piston 28. It can be seen that a chamber 44 is generally cooperatively defined by and between the outer diameter 30 of piston 28, cylinder 34 and the wall portion of smaller cylinder 26. Chamber 44, which contains spring 40, is, in turn, in communication with a conduit 46. Further, as illustrated at 48, a snap ring may be carried by housing 12 in order to maintain piston 28 in assembled relationship, with respect to housing 12 against the resilient resistance of spring 40.

A pair of arms or struts 48 and 50, which may be formed integrally with piston 28, carry a bearing support 52 which is preferably centrally disposed within piston 28. A pair of split bearings 54 and 56, retained within support 52, cooperate to engage a spherical end 58 of a connecting or motion transmitting link 60 the other end 62 of which is similarly operatively engaged by split bearings 64 and 66 retained within a bearing support portion 68 carried by the butterfly valve 70.

Figure 4:
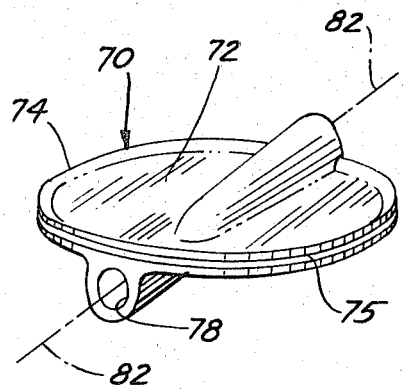
FIG. 4 is a perspective view of one of the elements shown in each of FIGS. 1, 2 and 3.
Figure 2:
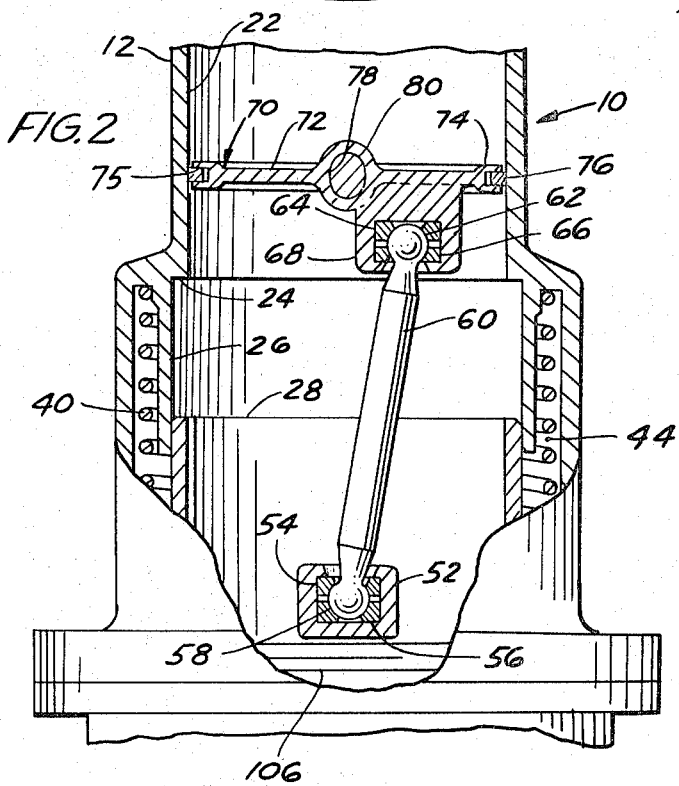
FIG. 2 is a fragmentary cross-sectional view taken generally on the plane of line 2–2 of FIG. 1 and looking in the direction of the arrows.

As also shown in FIGS. 2, 3 and 4, valve 70 is comprised of a platelike or disk portion 72 having a peripheral cross-sectionally enlarged rimlike portion 74 with an annular groove 75 formed therein for the reception of pistonlike sealing ring 76. The disk or body portion 72 has a cylindrical opening 78 formed therethrough in which is tightly received a valve mounting shaft 80. As best illustrated in FIGS. 1 and 4, the cylindrical opening 78 is formed as to have its centerline 82 skew or inclined with respect to the general plane of the valve disk or body 72.

In-line bores 84 and 86 formed in body 12 so as to be at an inclined angle with respect to the center line of conduit portion 22 respectively receive therein journal bearings 88 and 90 which, in turn pivotally receive the ends 92 and 94 of valve mounting shaft 80. The angle of bores 84 and 86 is such as to cause the plate or disk body 72 of valve 70 to be substantially normal to the centerline of conduit 22 when the valve 70 is in its closed position (as shown). The portion of shaft 80 generally intermediate ends 92 and 94 may be provided with a plurality of axially directed splines, as shown at 96, for drivingly securing valve 70 to shaft 80. As viewed in FIG. 1, the right end of shaft 80 is provided with an enlarged body portion 98 which carries therein a bar magnet 100 suitably secured thereto for rotation therewith. In order to achieve only simple pivotal rotation of valve 70 within conduit 22 while having its axis of rotation at an angle other than normal with respect to the centerline of conduit 22, peripheral portions of valve plate 72 are arcuately relieved as generally shown at 102 and 104 of FIG. 3. Preferably, a snap type retainer ring 106 would be carried internally of housing 12 in order to assure a continued assembled relationship of the piston 28 and housing 12 should the valve assembly 10 be disassembled from the conduits 14 and 16.

As also shown in FIG. 1, a control assembly 108, comprising, among other things, a housing 110, is secured to housing 12, by any suitable means in a manner so as to contain therebetween a gasketlike wall portion 112 of nonmagnetic material.

A solenoid assembly 114, having a housing 116 with a flange 118, is retained within control housing 116 by means of an annular nut 120 threadably engaged therewith and bearing axially against flange 118. An extension 122 of moveable solenoid core or armature 124 has a first annular groove formed therein for retaining thereon a spring cup 126 for containing a compression spring 128 between the cup 126 and flange end plate 118.

An actuating circuit for solenoid assembly 114 is comprised of first and second electrical terminals 130 and 132 respectively electrically connected to conductors 134 and 136 leading to a terminal 138 of switch assembly 140 and a terminal 142 of the source of electrical potential 144. A third conductor 146 serves to electrically connect the other terminal 148 of source 144 to the moveable switch member 150 of switch assembly 140.

A generally U-shaped member 152 having one end or leg 154 secured to solenoid extension 122 is provided at its other end or leg with a double poppet valve portion 156 positioned so as to be generally between normally open valve seat portions of conduits 158 and 160. Conduit 158 communicates with a source of atmospheric pressure, as by passage means 162, while conduit 160 communicates with conduit 22 on the high-pressure side of valve 70 as by means of conduits 164, 166 and an orifice 168 formed through wall 112.

Chamber 170, formed within housing 110 and generally containing spring 128 and valve member 152 is, at times, placed in communication with passages or conduits 158 and 160, depending upon the position of poppet valve 156; further, chamber 170 is placed in constant communication with chamber 44 by means of serially arranged conduits 172 (formed in housing 110) and 46.

A second chamber 174, formed in housing 110 and provided with a transversely extending support strut 176, contains first and second reed type electrical switches 178 and 180. As seen in both FIGS. 1 and 5, the support portion 176 is formed with suitable recesses 182 and 184 which respectively closely receive therein reed switches 178 and 180 in a manner so as to position such reed switches in a crossed relationship to each other. In the embodiment shown, switches 178 and 180 would be arranged at ninety degrees with respect to each other and switch 178 would be somewhat coplanar or parallel to bar magnet 100 when the butterfly valve 70 is in the closed position (as shown). Reed switches 178 and 180 along with bar magnet 100 combine to form a feedback system for indicating or producing an output signal related to the position of the butterfly valve 70. As is well known in the art, reed switches are electrical switching devices having portions thereof influenced by the pressure and/or absence of a magnetic field. In the embodiment disclosed, the reed switches are normally open and become closed whenever a parallel magnetic field (of sufficient density) is generated in sufficiently close proximity thereto.

Reed switch 178 has its opposite terminals respectively connected to conductors 186 and 190 while reed switch 180 has its opposite terminals respectively connected to conductors 192 and 194. An electrical connecter 196, generally closing one end of chamber 174, has its through terminals 198, 200, 202 and 204 respectively connected, at one end, to conductors 186, 192, 194 and 190. The opposite ends of connecter terminals 198, 200, 202 and 204 are respectively connected to conductors 206, 208, 210 and 212 respectively leading to a first signal means or lamp 214, a second signal lamp 216 and conductor 218 leading to one terminal of a source of electrical potential 220. The other terminal of source 220 is connected, as by a conductor 222, to the other sides of indicator lamps 214 and 216 via respective conductors 224 and 226. In view of the above, it can be seen that closure of reed switch 178 causes energization of signal means 214 while closure of reed switch 180 causes energization of signal means 216.

It should be pointed out that for purposes of clarity, dual electrical sources 144 and 220 have been illustrated; however, it should be apparent that a single source of such electrical potential may be employed.

OPERATION

First, it should be realized that the valve 70 may be either normally opened or normally closed. However, for purposes of disclosure, the embodiment herein disclosed is one wherein the butterfly valve 70 is normally closed.

In the embodiment disclosed, as long as switch 150 is open and solenoid assembly 114 deenergized armature 124, including extension 122 thereof, will be maintained in an upper or extended position by virtue of spring 128. At this time poppet valve 156 will be held against port or servo conduit 158 thereby closing chamber 170 from the ambient atmospheric pressure, Pa, which is less than the relatively high pressure, $P_1$, contained being communicated by conduit 14. At this time pressure $P_1$ contained anterior or upstream of butterfly valve 70 is communicated via conduits 164, 166 and servo conduit 160 to chamber 170 because the poppet valve 156 is being held away from or off of the open end of servo conduit 160. Such pressure, $P_1$, within chamber 170 is, in turn, communicated to chamber 44 via conduits 172 and 46. As a consequence thereof, it can be seen that piston 28 is pneumatically balanced; that is, the force of the pressure at the lower end of piston 28 is equal to the force of the pressure at the upper end of piston 28. Therefore, because of this balanced condition, compression spring 40 is able to hold piston 28 in its lowermost position and, because of the interconnection by link 60, keep the butterfly valve 70 closed within conduit 22. At this time bar magnet 100, as shown in FIGS. 1 and 5, is in line or parallel with reed switch 178 thereby causing reed switch 178 to close and energize the signal means or lamp 214.

When switch 150 is closed and the windings of solenoid assembly 114 energized, armature 124 and extension 122 will move downwardly, against the force of spring 128, causing poppet valve portion 156 to open servo conduit 158 and close servo conduit 160. This, in turn, causes further communication between chamber 170 and conduit 160 to be terminated while, at the same time completing communication between chamber 170 and the atmospheric pressure via passageway 162. The relatively low-pressure, Pa, is then communicated to chamber 44 via conduits 46 and 172. However, at the same time the relatively high-pressure, $P_1$, is being directed to the inlet 18 by supply conduit 14.

An inspection of FIG. 1 will disclose that piston 28 is comprised of a plurality of effective pressure areas. That is, a first pressure area ($A_1$) is located at the upper end of piston 28 and defined generally by the projected annular surface area existing between the outer diameter 30 and inner diameter 230. Any pressure directed against this first pressure area urges the piston 28 downwardly.

A second pressure area ($A_2$) is located at the lower end of piston 28 and defined generally by the projected annular surface area existing between the enlarged outer diameter 32 and inner diameter 230. Any pressure directed against this second pressure area, $A_2$, urges the piston 28 upwardly.

A third pressure area ($A_3$) is located generally at the lower end of piston 28 and exposed to the pressure within chamber 44. Such pressure area $A_3$ is defined generally by the upwardly projected annular surface area existing between the enlarged outer diameter 32 and outer diameter 30. Any pressure directed against this third area, $A_3$, urges the piston 28 downwardly.

In view of the above, it should be evident areas $A_1$ and $A_3$ are, when added, equivalent to area $A_2$ and that therefore piston 28 can be said to be a differential area piston member in that displacement or movement of piston 28 can be achieved by varying the pressure applied to one or more of the three pressure areas $A_1$, $A_2$, and $A_3$.

When atmospheric pressure is admitted into chamber 44, as set out above, a differential in pressure is immediately realized as between area $A_3$ and an equivalent surface area on pressure surface $A_2$ equal to area $A_3$. Such differential in pressure causes a resultant upward force on piston 28 of a magnitude sufficient to move piston 28 upwardly against spring 40. Such upward movement of piston 28 is transmitted, via linkage 60, to valve 70 causing valve 70 and shaft 80 to pivot counterclockwise, as viewed in FIG. 2, to an opened position. As butterfly valve 70 opens, the fluid under a pressure $P_1$ may experience a pressure drop as it flows past the throttle valve and exist downstream thereof at some lesser pressure $P_2$. As the valve 70 is thusly rotated to an opened position, bar magnet 100 moves out of alinement with reed switch 178, thereby deenergizing signal means or lamp 214, and into alinement with reed switch 180 causing switch 180 to become closed energizing signal means or lamp 216.

When it is determined that a sufficient quantity of air or other fluid has flowed past opened butterfly valve 70, switch 150 is again opened and high-pressure $P_1$ is again admitted to chamber 44 causing piston 28 to become balanced and consequently be returned downwardly by spring 40 thereby closing butterfly valve 70.

The invention has been disclosed illustrating solenoid switch assembly 140 as including a switch member 150, which, especially in aircraft applications, can be manually opened and closed as by the pilot or flight engineer. However, switch member 150 may in fact be one which would be opened and closed by a related control device responsive to the presence of frost and/or ice formation on the particular surface of the aircraft under scrutiny. Such control devices are generally well known in the art and their application to this invention would be well within the ability of one skilled in the art.

Further, output signal means 214 and 216, for purposes of disclosure, have been illustrated as being electrical lamps for creating visual signals to the pilot (to this extent such lamps could be of different color making rapid determination possible). However, it is conceivable that the reed switches 178 and 180 could be employed for closing energizing circuits other than for energizing lamps. For example, if solenoid switch 150 were of the type which when closed would be held closed by a suitable relay type field, and if reed switch 180 were employed for opening and closing an electrical circuit including timer means it is conceivable that after butterfly valve moved to an open position and closed reed switch 180 that the timer would be energized. After an expiration of a predetermined span of time, the timer would cause switch member 150 to again become opened.

In view of the preceding, it should be apparent that the invention provides a novel, compact and efficient valving arrangement highly suited for use in aircraft applications for at times directing the flow of high-pressure hot air to selected aircraft surfaces for either the prevention or removal of frost and ice formations. The ultimate power for moving the valve 70 to and from an opened position is supplied by a differential area flow-through piston which itself serves as a portion of the conduit means for directing the flow of such hot high-pressure air. Further, leakages past the butterfly valve 70 are, for all practical purposes, eliminated since all possible leak passages around the pivot shaft 80 are effectively sealed in and the inclined position of the pivot shaft 80 enables the rather tight engagement of all peripheral surfaces of the valve assembly 70 whenever it is brought to a closed position.

Although only one preferred embodiment of the invention has been disclosed and described it is apparent that other embodiments and modifications of the invention are possible within the scope of the appended claims.

I claim:

1. A valve assembly for controlling the flow of a relatively high-pressure fluid, comprising a housing, an inlet formed in said housing for admitting said fluid under said high-pressure, an outlet formed in said housing, conduit means formed in said housing and interconnecting said inlet and said outlet, a valve member situated within said conduit means for only simple pivotal rotation therein to and from opened an closed positions, said valve member being fixed against translational movement and being located generally between said inlet and said outlet so as to be effective when closed to prevent the flow of said fluid through said outlet, differential area pressure responsive piston means situated in said conduit means on the inlet side of said valve member, motion transmitting means operatively interconnecting said valve member and said pressure responsive piston means for causing only said simple pivotal rotation of said valve member upon movement of said pressure responsive piston means, and additional means for at times directing pressures of varying magnitudes no higher than the pressure at said inlet to opposed portions of said pressure responsive piston means for causing said piston means to undergo movement and cause only said simple pivotal rotation of said valve member.

2. A valve assembly according to claim 1 wherein said valve member comprises a butterfly type valve, wherein said differential area pressure responsive piston means comprises a tubular piston member slidably received within conduit means for axial movement therein, and wherein said motion transmitting means comprises linkage means operatively connected to both a said tubular piston member and said butterfly valve.

3. A valve assembly according to claim 1 wherein said valve member comprises a butterfly type valve, wherein said differential area pressure responsive piston means comprises a tubular piston member slidably received within said conduit means for axial movement therein, and wherein said motion transmitting means comprises linkage means pivotally connected to both said tubular piston member and said butterfly valve.

4. A valve assembly according to claim 1 including feedback indicating means for creating a signal indicative of whether said valve member has attained opened or closed position, said feed back indicating means comprising a first magnetically actuated reed switch rigidly secured with respect to said housing, a second magnetically actuated reed switch rigidly secured with respect to said housing, a polar magnet operatively secured to said valve member for pivotal rotation therewith, said polar magnet being so positioned as to have its polar direction transverse to the axis of rotation of said valve member, said first reed switch being so positioned as to be in generally parallel relationship to said polar magnet when said valve member is in its closed position, and said second reed switch being so positioned as to be in generally parallel relationship to said polar magnet when said valve member is in its opened position, and circuit means including signal generating means electrically connected to said reed switches for producing signals indicative of which reed switch has been actuated by said polar magnet.

5. A valve assembly according to claim 1 wherein said valve member comprises a butterfly type valve situated in said conduit means so as to be substantially normal to the longitudinal axis of said conduit means whenever said butterfly valve is in its closed position, including a pivot shaft carried by said housing for pivotally supporting said butterfly valve in said conduit means, said pivot shaft being so positioned as to define an axis of rotation which is at an inclined angle with respect to a plane passing normal to the longitudinal axis of said conduit means, wherein said differential area pressure responsive piston means comprises a tubular piston member slidably received within said conduit means for axial movement therein, and wherein said motion transmitting means comprises linkage means, said butterfly valve including a bearing support portion for pivotally connecting thereto said linkage means, said piston member including a second bearing support portion for pivotally connecting thereto said linkage means.

6. A valve assembly according to claim 1 wherein said valve member comprises a butterfly type valve, wherein said differential area pressure responsive piston means comprises a tubular piston member slidably received within said housing for axial movement therein, and wherein said motion transmitting means comprises linkage means operatively connected to both said tubular piston member and said butterfly valve, said tubular piston member comprising a first outer cylindrical surface of a first diametral dimension for effecting sliding engagement relative to said housing, said tubular piston member also comprising a second outer cylindrical surface concentric to said first outer cylindrical surface and of a second diametral dimension greater than said first diametral dimension for effecting sliding engagement relative to said housing, said tubular piston member also comprising a third diametral dimension less than said first diametral dimension, said third inner cylindrical surface being effective for forming a portion of said conduit means on the inlet side of said butterfly valve.

7. A valve assembly according to claim 1 wherein said valve member comprises a butterfly type valve, wherein said differential area pressure responsive piston means comprises a tubular piston member slidably received within said housing for axial movement therein, and wherein, said motion transmitting means comprises linkage means operatively connected to both said tubular piston member and said butterfly valve, said tubular piston member comprising a first portion with a first outer cylindrical surface of a first diametral dimension for effecting sliding engagement relative to said housing, said tubular piston member also comprising a second portion with a second outer cylindrical surface concentric to said first outer cylindrical surface and of a second diametral dimension greater than said first diametral dimension for effecting sliding engagement relative to said housing, said tubular piston member also comprising a third inner cylindrical surface extending axially through said first and second piston portions and of a third diametral dimension less than said first diametral dimension, said third inner cylindrical surface being effective for forming a portion of said conduit means on the inlet side of said butterfly valve, a chamber of variable volume defined generally by and between said housing said first outer cylindrical surface and said second piston portion, said chamber being placed in communication with said additional means for at times receiving therein fluid at a relatively high-pressure and at other times receiving therein fluid at a relatively low-pressure in order to thereby create pressure differentials across said second piston portion and effect axial movement of said piston member.

8. A valve assembly according to claim 7 including feedback indicating means for creating a signal indicative of whether said butterfly valve has attained opened or closed position, said feedback indicating means comprising a first magnetically actuated reed switch rigidly secured with respect to said housing, a second magnetically actuated reed switch rigidly secured with respect to said housing, a polar magnet operatively secured to said butterfly valve for pivotal rotation therewith, said polar magnet being so positioned as to have its polar direction transverse to the axis of rotation of said butterfly valve, said first reed switch being so positioned as to be in generally parallel relationship to said polar magnet when said butterfly valve is in its closed position, and said second reed switch being so positioned as to be in generally parallel relationship to said polar magnet when said butterfly valve is in its opened position, and circuit means including signal generating means electrically connected to said reed switches for producing signals indicative of which reed switch has been actuated by said polar magnet.

9. A valve assembly according to claim 7 wherein said additional means comprises first servo conduit means communicating with a source of relatively high-pressure fluid and terminating in a first poppet valve seat, second servo conduit means communicating with a source of relatively low-pressure fluid and terminating in a second poppet valve seat, and poppet valve means selectively positioned against either said first poppet valve seat or said second poppet valve seat for opening one of said servo conduit means and closing the other of said servo conduit means in order to thereby direct the fluid pressure through said opened servo conduit means to said chamber.

10. A valve assembly according to claim 9 including solenoid means effective upon energization to move said poppet valve means against one of said poppet valve seats, and resilient means effective upon deenergization of said solenoid means to move said poppet valve means against the other of said poppet valve seats.